United States Patent
Xiong et al.

(10) Patent No.: US 12,114,373 B2
(45) Date of Patent: Oct. 8, 2024

(54) GENERATION MODE, TRANSMISSION MODE OF UPLINK DATA SIGNALS AND EQUIPMENT THEREOF

(71) Applicant: Samsung Electronics Co., Ltd., Suwon-si (KR)

(72) Inventors: Qi Xiong, Beijing (CN); Feifei Sun, Beijing (CN); Yi Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 336 days.

(21) Appl. No.: 17/662,191

(22) Filed: May 5, 2022

(65) Prior Publication Data

US 2022/0361256 A1  Nov. 10, 2022

(30) Foreign Application Priority Data

| May 8, 2021 | (CN) | 202110501313.5 |
| Sep. 28, 2021 | (CN) | 202111146561.9 |
| Nov. 11, 2021 | (CN) | 202111333696.6 |
| Nov. 16, 2021 | (CN) | 202111358126.2 |
| Dec. 10, 2021 | (CN) | 202111506432.6 |

(51) Int. Cl.
| *H04W 74/00* | (2009.01) |
| *H04W 72/0446* | (2023.01) |
| *H04W 72/1263* | (2023.01) |
| *H04W 72/23* | (2023.01) |
| *H04W 74/08* | (2009.01) |
| *H04W 74/0833* | (2024.01) |

(52) U.S. Cl.
CPC ... *H04W 74/0841* (2013.01); *H04W 72/0446* (2013.01); *H04W 72/1263* (2013.01); *H04W 72/23* (2023.01); *H04W 74/002* (2013.01); *H04W 74/0866* (2013.01)

(58) Field of Classification Search
CPC ......... H04W 74/0841; H04W 72/0446; H04W 72/1263; H04W 72/23; H04W 74/002; H04W 74/0866; H04W 72/21; H04W 72/1268; H04W 72/232; H04W 74/0833; H04L 5/005; H04L 5/0044; H04L 5/0051; H04L 5/0053; H04L 5/0094; H04L 5/0048; H04L 5/0098
See application file for complete search history.

(56) References Cited

U.S. PATENT DOCUMENTS

| 2013/0107838 A1 | 5/2013 | Li et al. |
| 2019/0349964 A1 | 11/2019 | Liou |
| 2021/0259040 A1* | 8/2021 | Babaei ................ H04W 73/23 |

(Continued)

OTHER PUBLICATIONS

LG Electronics Inc., "Discussion on Physical Layer Aspects of Small Data Transmission", 3GPP TSG RAN WG1 Meeting #104B-e, Apr. 12-20, 2021, R1-2103334, 5 pages.

(Continued)

*Primary Examiner* — Brandon M Renner

(57) ABSTRACT

The application provides a method performed by a user equipment in a wireless communication system, comprising: receiving first configuration information for transmitting uplink data signals from a base station, determining uplink transmission resources based on a first downlink signal associated with uplink transmission resources indicated in the first configuration information, and transmitting the uplink data signals.

15 Claims, 9 Drawing Sheets

(56) References Cited

U.S. PATENT DOCUMENTS

| | | | |
|---|---|---|---|
| 2021/0360680 A1* | 11/2021 | Nam | H04L 5/0044 |
| 2022/0006576 A1* | 1/2022 | Fong | H04L 1/1896 |
| 2022/0210798 A1* | 6/2022 | Tsai | H04L 5/0094 |
| 2023/0217529 A1* | 7/2023 | Xu | H04W 74/0833 370/329 |
| 2024/0072871 A1* | 2/2024 | Wu | H04W 76/20 |
| 2024/0155502 A1* | 5/2024 | Lin | H04W 52/36 |
| 2024/0179753 A1* | 5/2024 | Wu | H04W 74/0833 |

OTHER PUBLICATIONS

Apple Inc., "Discussion on physical layer aspects of small data transmission", 3GPP TSG RAN WG1 #104b-e, Apr. 12-20, 2021, R1-2103075, 2 pages.

Nokia et al., "On physical layer aspects of small data transmission", 3GPP TSG RAN WG1 #104bis, Apr. 12-20, 2021, R1-2102647, 7 pages.

International Search Report dated Aug. 5, 2022 in connection with International Patent Application No. PCT/KR2022/006435, 3 pages.

Written Opinion of the International Searching Authority dated Aug. 5, 2022 in connection with International Patent Application No. PCT/KR2022/006435, 4 pages.

3GPP TS 38.213 V17.1.0 (Mar. 2022), Technical Specification, 3rd Generation Partnership Project; Technical Specification Group Radio Access Network; NR; Physical layer procedures for control (Release 17), Mar. 2022, 245 pages.

3GPP TS 38.214 V17.1.0 (Mar. 2022), Technical Specification, 3rd Generation Partnership Project; Technical Specification Group Radio Access Network; NR; Physical layer procedures for data (Release 17), Mar. 2022, 225 pages.

* cited by examiner

GENERATION MODE, TRANSMISSION MODE OF UPLINK DATA SIGNALS AND EQUIPMENT THEREOF

CROSS-REFERENCE TO RELATED APPLICATIONS

This application is based on and claims priority under 35 U.S.C. § 119 to Chinese Patent Application No. 202110501313.5, filed May 8, 2021, Chinese Patent Application No. 202111146561.9, filed Sep. 28, 2021, Chinese Patent Application No. 202111333696.6, filed Nov. 11, 2021, Chinese Patent Application No. 202111358126.2, filed Nov. 16, 2021, and Chinese Patent Application No. 202111506432.6, filed Dec. 10, 2021, the disclosures of which are incorporated by reference herein in their entirety.

BACKGROUND

1. Field

The present disclosure relates to a generation mode, a transmission mode of uplink data signals and an equipment thereof.

2. Description of Related Art

In order to meet the increasing demand for wireless data communication services since the deployment of 4G communication systems, efforts have been made to develop improved 5G or quasi-5G communication systems. Therefore, 5G or quasi-5G communication system is also called "super 4G network" or "post-LTE system."

The 5G communication system is implemented in a higher frequency (millimeter, mmWave) band, for example, a 60 GHz band, to achieve a higher data rate. In order to reduce the propagation loss of radio waves and increase the transmission distance, beamforming, large-scale multiple-input multiple-output (MIMO), full-dimensional MIMO (FD-MIMO), array antenna, analog beamforming and large-scale antenna technologies are discussed in 5G communication system.

In addition, in 5G communication system, based on advanced small cell, cloud radio access network (RAN), ultra dense network, device-to-device (D2D) communication, wireless backhaul, mobile network, cooperative communication, cooperative multipoint (CoMP), receiver interference cancellation, etc., the development of system network improvement is underway.

In 5G systems, advanced coding modulation (ACM), such as hybrid FSK and QAM modulation (FQAM) and sliding window superposition coding (SWSC), and advanced access technologies, such as filter bank multicarrier (FBMC), non-orthogonal multiple access (NOMA) and sparse code multiple access (SCMA) have been developed.

SUMMARY

According to one aspect of the present disclosure, there is provided a method executed by a user equipment in a wireless communication system, comprising: receiving first configuration information for transmitting uplink data signals from a base station, determining uplink transmission resources based on a first downlink signal associated with uplink transmission resources indicated in the first configuration information, and transmitting the uplink data signals.

In another aspect of the present disclosure, there is provided a method executed by user equipment in a wireless communication system, further comprising: when the first configuration information does not include an indication of a first downlink signal to which uplink transmission resources are associated, determining uplink transmission resources according to a second downlink signal configured in a system broadcast message of the base station, and transmitting uplink data signals.

In another aspect of the present disclosure, there is provided a method executed by a user equipment in a wireless communication system, wherein the system broadcast message is a system broadcast message read by the user equipment before entering the radio resource control RRC inactivity or a latest system broadcast message.

In another aspect of the present disclosure, there is provided a method executed by user equipment in a wireless communication system, wherein the first downlink signal or the second downlink signal includes any one of a synchronization signal block (SSB) and a channel state information reference signal (CSI-RS).

In another aspect of the present disclosure, there is provided a method executed by user equipment in a wireless communication system, wherein the user equipment determines uplink transmission resources by at least one of the following ways: determining uplink transmission resources according to the uplink transmission resources to which the first downlink signal is mapped; determining uplink transmission resources according to the mapping of the first downlink signal or the second downlink signal to uplink transmission resources in sequence.

In another aspect of the present disclosure, there is provided a method executed by user equipment in a wireless communication system, further comprising: when the first configuration information for transmitting uplink data signals does not include an indication of the mapping ratio of the first downlink signal to a corresponding uplink transmission resource, the user equipment transmits by at least one of the following ways: when the selected downlink signal is in the first downlink signal or the second downlink signal when transmitting the uplink data signals, the user equipment transmits using the uplink transmission resource corresponding to the selected downlink signal, if there are multiple optional uplink transmission resources and/or demodulation reference signal DMRS resources, the user equipment randomly selects one resource to transmit.

In another aspect of the present disclosure, there is provided a method executed by user equipment in a wireless communication system, further comprising: when the first configuration information for transmitting uplink data signals does not include an indication of the mapping ratio of the first downlink signal to uplink transmission resources, the user equipment determines the mapping ratio according to the ratio of at least one of the following numbers to a number of associated downlink signals: a number of physical uplink shared channel (PUSCH) transmission resources in the configuration period of the uplink data signals; a number of resources of PUSCH DMRS; and a number of PUSCH transmission units.

In another aspect of the present disclosure, there is provided a method executed by user equipment in a wireless communication system, further including: before uplink data signal transmission, the user equipment selects downlink signals through downlink measurement, and when the downlink signals selected by the user equipment are not among the downlink signals associated with the uplink data signals received by the user equipment, the user equipment performs at least one of the following operations: the user equipment transmits uplink data signals based on random access; the user assumes that the downlink signal can only be selected from the associated downlink signals indicated by the base station in the uplink data signal configuration; or the user equipment assumes that the associated downlink signals indicated by the base station in the uplink data signal configuration include all downlink signals that the user equipment may measure.

In another aspect of the present disclosure, there is provided a method executed by a user equipment in a wireless communication system, wherein determining uplink transmission resources for transmitting uplink signals includes determining a number of retransmission of uplink data signals, wherein, the number of retransmission of uplink data signals is determined according to time domain resource assignment (TDRA) table, existing bits or idle bits in uplink UL grants, other remaining reserved bits in downlink control information (DCI) and/or a combination of reserved bits in downlink control information DCI and existing/reserved bits in uplink UL grants.

In another aspect of the present disclosure, there is provided a method executed by user equipment in a wireless communication system, wherein determining uplink transmission resources for transmitting uplink signals includes receiving indication information indicating a table to which time domain resource assignment (TDRA) indication bits are applicable, wherein for the initial transmission of uplink data signals, the indication information is received through a medium access control (MAC) or a random access response (RAR); and wherein, for retransmission of the uplink data signal, the indication information is received through DCI.

In another aspect of the present disclosure, there is provided a method executed by user equipment in a wireless communication system, wherein the method further comprises: after the user equipment determines the configuration of TDRA and the configuration of repetition number, the user equipment judges whether the configured resources can be used for uplink data transmission, wherein when the configured time unit conflicts with the time unit of a specific signal, the time unit with the conflict is unavailable or the whole transmission resources including the time unit with the conflict are unavailable.

In another aspect of the present disclosure, there is provided a method executed by user equipment in a wireless communication system, wherein the specific signal includes invalid symbol pattern information configured by at least one of the following: a list with invalid symbol patterns configured in system information; DCI for scheduling retransmission of uplink data signals; RAR or UL grant for scheduling retransmission of uplink data signals.

In another aspect of the present disclosure, there is provided a method executed by user equipment in a wireless communication system, when random access occasions for SDT are shared with other types of random access occasions, available random access occasions are jointly confirmed by random access mask index and corresponding SSB index and/or types of random access.

In another aspect of the present disclosure, there is provided a method executed by user equipment in a wireless communication system, wherein, in the process of SDT for data transmission, the condition in which the quality of downlink transmission beam selected by UE changes is determined.

In another aspect of the present disclosure, there is provided a method executed by user equipment in a wireless communication system, wherein the UE notifies the beam change in the SDT process through at least one of PUCCH resources configured by a base station, MAC CE carried on PUSCH resources configured by the base station, and UCI part carried on PUSCH.

In another aspect of the present disclosure, there is provided a method executed by user equipment in a wireless communication system, wherein UE determines the uplink transmission beam used when SDT PUSCH is transmitted.

In another aspect of the present disclosure, there is provided a method executed by user equipment in a wireless communication system, further comprising: applying the determined activated invalid symbol pattern to all repeated time slots of the configured uplink data signals.

In another aspect of the present disclosure, there is provided an electronic device, including a memory configured to store a computer program; and a processor configured to run the computer program to implement the methods according to any one of the above embodiments.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The technical scheme of this embodiment can be applied to various communication systems, such as global system for mobile communications (GSM) system, code division multiple access (CDMA), CDMA) system, wideband code division multiple access (WCDMA) system, general packet radio service (GPRS), long term evolution (LTE), LTE) system, LTE frequency division duplex (FDD) system, LTE time division duplex (TDD), universal mobile telecommunications system (universal mobile telecommunication system, UMTS), worldwide interoperability for microwave access (WiMAX) communication system, 5th generation (5G) system or new radio (NR), etc. In addition, the technical scheme of the embodiment of this application can be applied to future-oriented communication technology.

Figure 1:
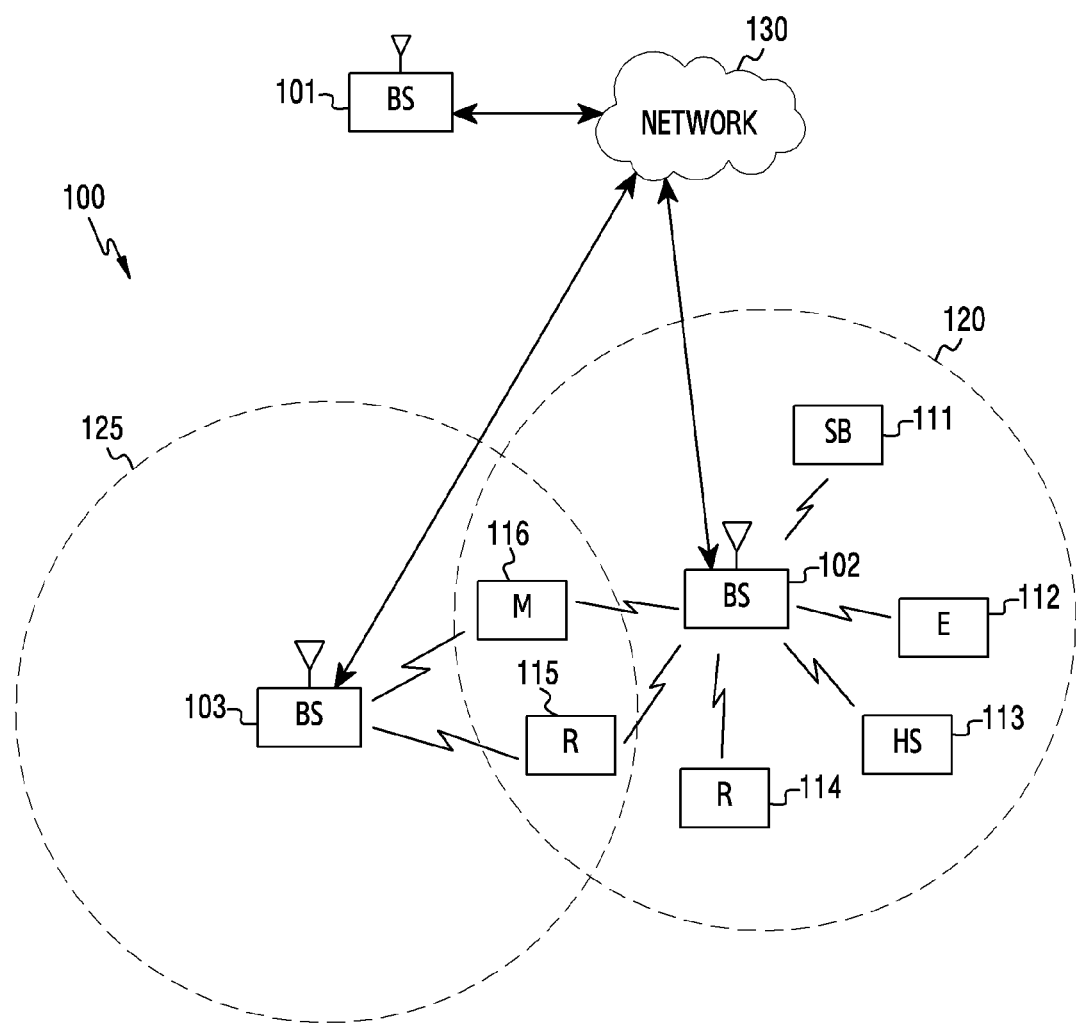
FIG. 1 illustrates a schematic diagram of an example wireless network 100 according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a gNodeB (gNB) 101, a gNB 102, and a gNB 103. The gNB 101 communicates with the gNB 102 and the gNB 103. The gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB." For convenience, the terms "gNodeB" and "gNB" are used in this patent document to refer to network infrastructure components that provide wireless access for remote terminals. And, depending on the type of the network, other well-known terms such as "mobile station," "user station," "remote terminal," "wireless terminal" or "user apparatus" can be used instead of "user equipment" or "UE." For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

A gNB 102 provides wireless broadband access to the network 130 for a first plurality of ser equipments (UEs) within a coverage area 120 of the gNB 102. The first plurality of UEs include a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. The gNB 103 provides wireless broadband access to a network 130 for a second plurality of UEs within a coverage area 125 of the gNB 103. The second plurality of UEs include a UE 115 and a UE 116. In some embodiments, one or more of gNBs 101-103 can communicate with each other and with UEs 111-116 using 5G, LTE, LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in embodiments of the present disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, the gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, the gNB 101, 102, and/or 103 can provide access to other or additional external networks, such as external telephone networks or other types of data networks.

Figure 2A:
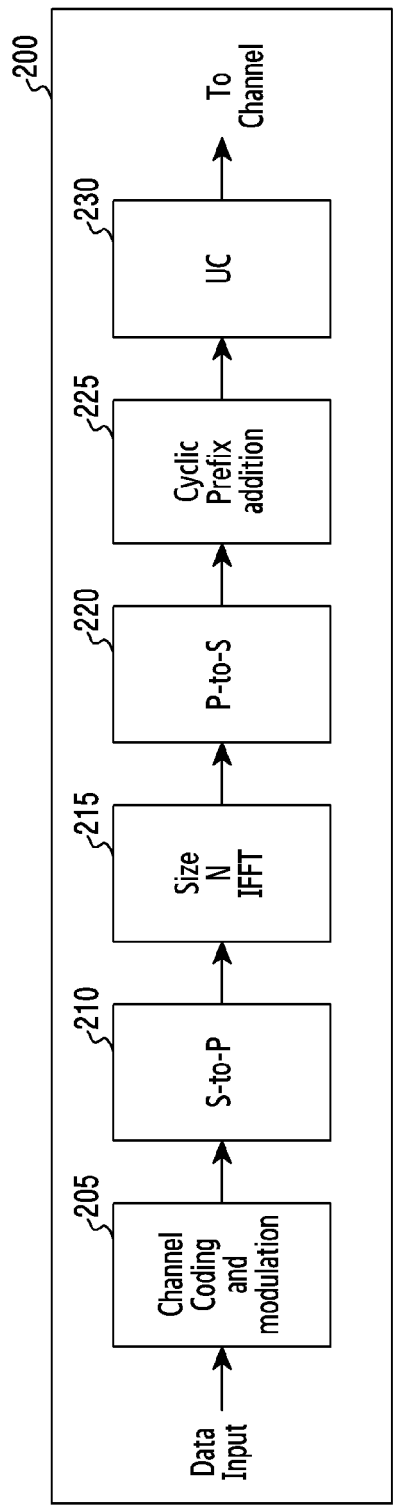
FIGS. 2A and 2B illustrate schematic diagrams of example wireless transmission and reception paths according to the present disclosure.
Figure 2B:
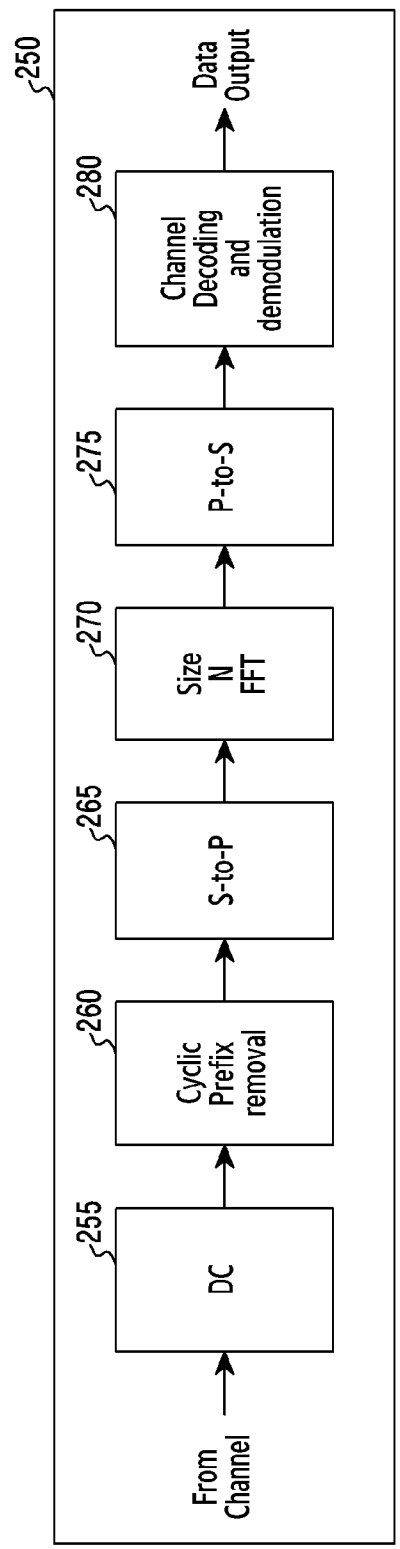

FIGS. 2A and 2B illustrate example wireless transmission and reception paths according to the present disclosure. In the following description, the transmission path 200 can be described as being implemented in a gNB, such as the gNB 102, and the reception path 250 can be described as being implemented in a UE, such as the UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the present disclosure.

The transmission path 200 includes a channel coding and modulation block 205, a serial-to-parallel (S-to-P) block 210, a size N inverse fast Fourier transform (IFFT) block 215, a parallel-to-serial (P-to-S) block 220, a cyclic prefix addition block 225, and an up-converter (UC) 230. The reception path 250 includes a down-converter (DC) 255, a cyclic prefix removal block 260, a serial-to-parallel (S-to-P) block 265, a size N fast Fourier transform (FFT) block 270, a parallel-to-Serial (P-to-S) block 275, and a channel decoding and demodulation block 280.

In the transmission path 200, the channel coding and modulation block 205 receives a set of information bits, applies coding (such as low density parity check (LDPC) coding), and modulates the input bits (such as using quadrature phase shift keying (QPSK) or quadrature amplitude modulation (QAM)) to generate a sequence of frequency-domain modulated symbols. The serial-to-parallel (S-to-P) block 210 converts (such as demultiplexes) serial modulated symbols into parallel data to generate N parallel symbol streams, where N is a size of the IFFT/FFT used in the gNB 102 and the UE 116. The size N IFFT block 215 performs IFFT operations on the N parallel symbol streams to generate a time-domain output signal. The parallel-to-serial block 220 converts (such as multiplexes) parallel time-domain output symbols from the size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from the gNB 102 arrives at the UE 116 after passing through the wireless channel, and operations in reverse to those at the gNB 102 are performed at the UE 116. The down-converter 255 down-converts the received signal to a baseband frequency, and the cyclic prefix removal block 260 removes the cyclic prefix to generate a serial time-domain baseband signal. The serial-to-parallel block 265 converts the time-domain baseband signal into a parallel time-domain signal. The size N FFT block 270 performs an FFT algorithm to generate N parallel frequency-domain signals. The parallel-to-serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to the UEs 111-116 in the downlink, and may implement a reception path 250 similar to that for receiving from the UEs 111-116 in the uplink. Similarly, each of UEs 111-116 may implement a transmission path 200 for transmitting to the gNBs 101-103 in the uplink, and may implement a reception path 250 for receiving from gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the present disclosure. Other types of transforms can be used, such as discrete Fourier transform (DFT) and inverse discrete Fourier transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
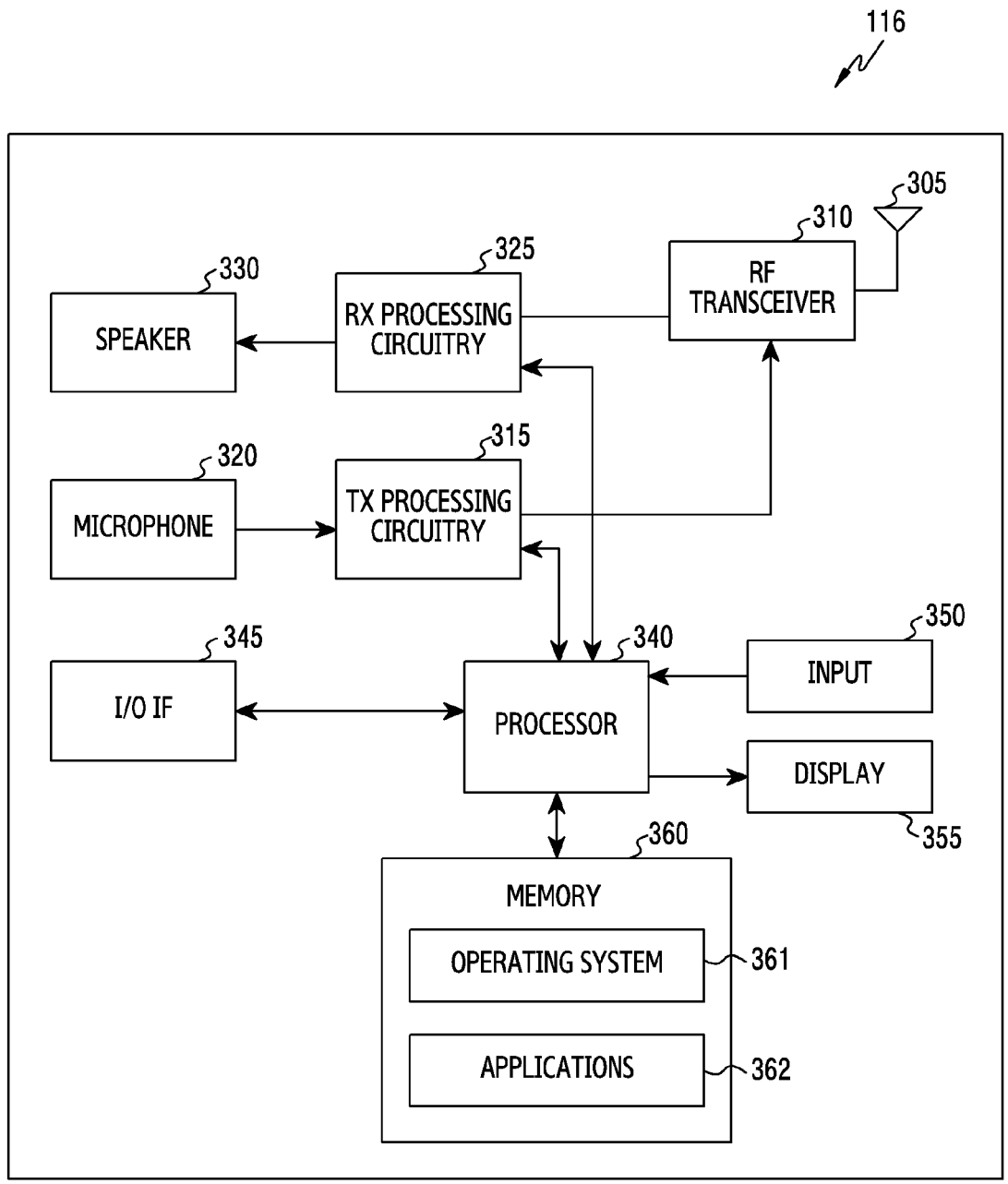
FIG. 3A illustrates a schematic diagram of an example UE 116 according to the present disclosure.

FIG. 3A illustrates an example UE 116 according to the present disclosure. The embodiment of UE 116 shown in FIG. 3A is for illustration only, and UEs 111-115 of FIG. 1 can have the same or similar configuration. However, a UE has various configurations, and FIG. 3A does not limit the scope of the present disclosure to any specific implementation of the UE.

The UE 116 includes an antenna 305, a radio frequency (RF) transceiver 310, a transmission (TX) processing circuit 315, a microphone 320, and a reception (RX) processing circuit 325. The UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the present disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

Figure 3B:
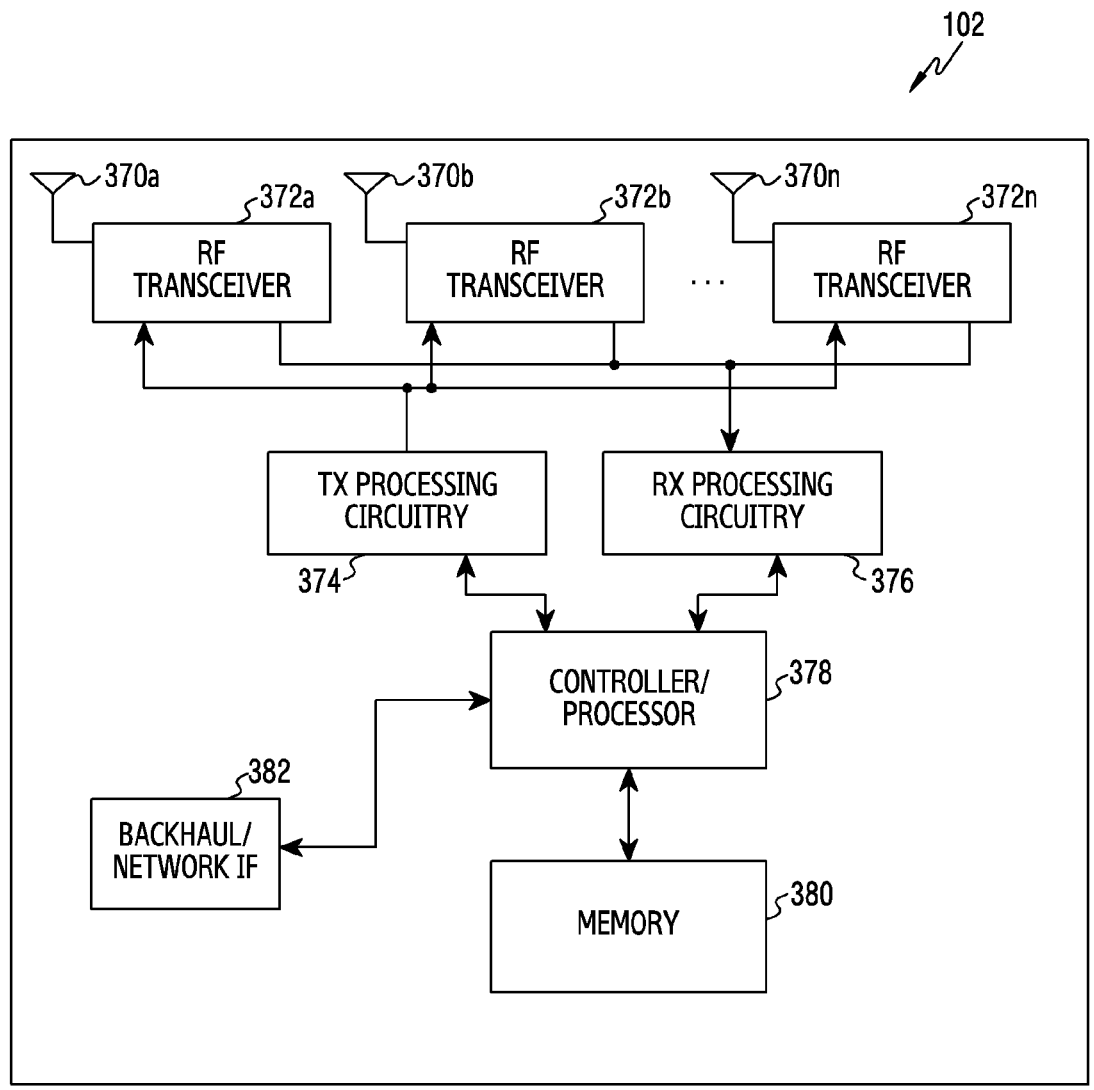
FIG. 3B illustrates a schematic diagram of an example gNB 102 according to the present disclosure.

FIG. 3B illustrates an example gNB 102 according to the present disclosure. The embodiment of gNB 102 shown in FIG. 3B is for illustration only, and other gNBs of FIG. 1 can have the same or similar configuration. However, a gNB has various configurations, and FIG. 3B does not limit the scope of the present disclosure to any specific implementation of a gNB. It should be noted that gNB 101 and gNB 103 can include the same or similar structures as gNB 102.

As shown in FIG. 3B, gNB 102 includes a plurality of antennas 370a-370n, a plurality of RF transceivers 372a-372n, a transmission (TX) processing circuit 374, and a reception (RX) processing circuit 376. In certain embodiments, one or more of the plurality of antennas 370a-370n include a 2D antenna array. gNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and up-convert the baseband or IF signal into an RF signal transmitted via antennas 370a-370n.

The controller/processor 378 can include one or more processors or other processing devices that control the overall operation of gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/processor 378 can perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the present disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions is configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372a-372n, TX processing circuit 374 and/or RX processing circuit 376) support aggregated communication with FDD cells and TDD cells.

Although FIG. 3B illustrates an example of the gNB 102, various changes may be made to FIG. 3B. For example, the gNB 102 can include any number of each component shown in FIG. 3A. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

Exemplary embodiments of the present disclosure are further described below with reference to the accompanying drawings.

Those skilled in the art can understand that the singular forms "a," "an," and "the" used here can also include plural forms unless specifically stated. It should be further understood that the word "comprising" used in the specification of this application means the presence of said features, integers, steps, operations, elements and/or components, but does not exclude the presence or addition of one or more other features, integers, steps, operations, elements, components and/or groups thereof. It should be understood that when an element is described as "connected" or "coupled" to another element, it may be directly connected or coupled to other elements, or there may be intervening elements. In addition, as used herein, the statements "connected" or "coupled" may include wireless connection or wireless coupling. As used herein, the phrase "and/or" includes all or any unit and all combinations of one or more associated listed items.

Those skilled in the art can understand that unless otherwise defined, all terms (including technical terms and scientific terms) used here have the same meaning as those commonly understood by ordinary technicians in the field to which this application belongs. It should also be understood that terms such as those defined in the general dictionary should be understood to have meanings consistent with those in the context of the prior art, and will not be interpreted with idealized or overly formal meanings unless specifically defined as here.

It can be understood by those skilled in the art that "terminal" and "terminal equipment" used here include not only the equipment including wireless signal receiver which is a wireless signal receiving equipment without capability of transmitting signals, but also the equipment including receiving and transmitting hardware which is capable of bidirectional communication on bidirectional communication link. Such devices may include: cellular or other communication devices with single-line display or multi-line display or cellular or other communication devices without multi-line display; personal communications service (PCS), which can combine voice, data processing, fax and/or data communication capabilities; personal digital assistant (PDA), which may include radio frequency receiver, pager, internet/intranet access, web browser, notepad, calendar and/or global positioning system (GPS) receiver; conventional laptops and/or palmtop computers or other devices having and/or including a radio frequency receiver. As used herein, "terminal" and "terminal equipment" can be portable, transportable, installed in the (aviation, maritime and/or land) transport, or suitable and/or configured to operate locally, and/or operate in any other place on the earth and/or space in a distributed manner. As used herein, "terminal" and "terminal equipment" can also be a communication terminal, an Internet terminal and a music/video playing terminal, such as PDA, mobile internet device (MID) and/or a mobile phone with music/video playing functions, a smart TV, a set-top box and other devices.

The time domain unit (also called time unit) in this disclosure can be: an OFDM symbol, an OFDM symbol group (composed of multiple OFDM symbols), a time slot, a time slot group (composed of multiple time slots), a subframe, a subframe group (composed of multiple subframes), a system frame and a system frame group (composed of multiple system frames). And the time domain unit can also be an absolute time unit, such as 1 millisecond, 1 second, etc. The time unit can also be a combination of various granularities, such as N1 time slots plus N2 OFDM symbols.

The frequency domain unit in this disclosure can be: a subcarrier, a subcarrier group (composed of multiple subcarriers), a resource block (RB), which can also be called a physical resource block (PRB), a resource block group (composed of multiple RBs), a band part (BWP), a band part group (composed of multiple BWPs), a band/carrier, a band group/carrier group. And the frequency domain unit can also be an absolute frequency domain unit, such as 1 Hz, 1 kHz, etc. The frequency domain unit can also be a combination of various granularities, such as M1 PRBs plus M2 subcarriers.

The text and drawings are provided as examples only to help readers understand the present disclosure. They are not intended and should not be interpreted as limiting the scope of the present disclosure in any way. Although some embodiments and examples have been provided, based on the disclosure herein, it is obvious to those skilled in the art that changes can be made to the illustrated embodiments and examples without departing from the scope of this disclosure.

Transmission in the wireless communication system includes: transmission from the base station (gNB) to the UE (called downlink transmission) (and corresponding time slot is called downlink time slot), and transmission from UE to the base station (called uplink transmission) (and corresponding time slot is called uplink time slot).

In the downlink communication of wireless communication system, the system periodically transmits synchronization signals and broadcast channels to users through synchronization signal block (SSB), and the periodicity is called SSB periodicity or SSB burst periodicity. At the same time, the base station may configure a physical random access channel configuration period (PRACH configuration period), in which a certain number of random access transmission occasions (also called random access occasions, PRACH transmission occasion (RO)) are configured, and all SSBs in an association period (a certain length of time) can be mapped to the corresponding ROs. In a mapping cycle from SSB to RO, all SSBs in one SSB periodicity can be mapped to the required random access resources. There can be one or more mapping cycles in one association period. An association pattern period from SSB to RO contains one or more association periods, and the mapping pattern from SSB to RO in each association pattern period is the same.

In the new radio (NR) communication system, before the establishment of radio resource control, such as in the random access procedure, the performance of random access directly affects the user experience. In traditional wireless communication systems, such as LTE and LTE-Advanced, the random access procedure is used in many scenarios, such as establishing initial link, cell handover, re-establishing uplink, RRC connection re-establishment, etc., and the random access procedure is divided into contention-based random access and contention-free random access according to whether users monopolize preamble resources. In the contention-based random access, each user chooses a preamble sequence from the same preamble sequence resources in the process of trying to establish uplink, and it is possible that multiple users choose the same preamble sequence to transmit to the base station. Therefore, the conflict resolution mechanism is an important research direction in random access, and how to reduce the probability of conflicts and how to quickly resolve the conflicts that have already occurred is the key index affecting the performance of random access.

Figure 4:
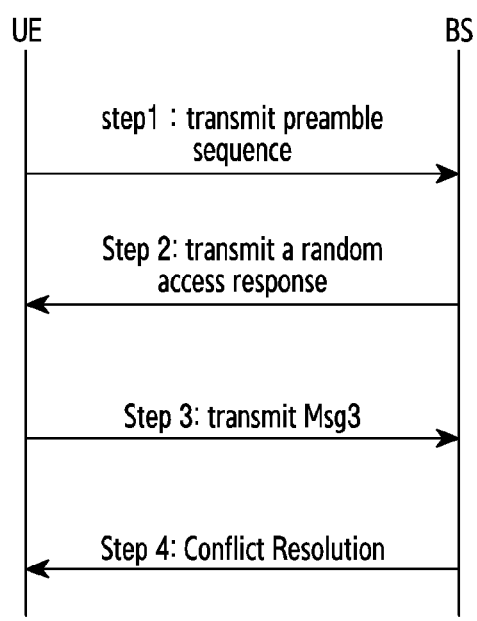
FIG. 4 illustrates a schematic diagram showing a contention-based random access in LTE-A according to an embodiment of the present disclosure.
Figure 5:
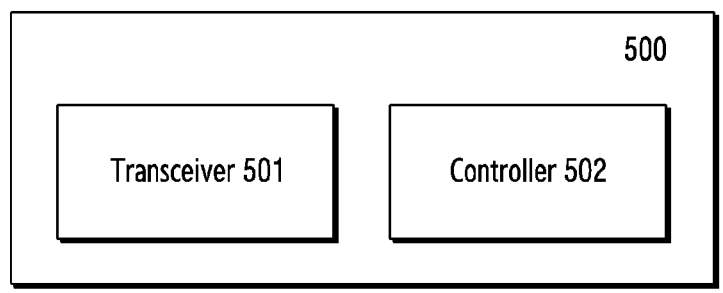
FIG. 5 illustrates a schematic diagram showing a user equipment that performs transmission of uplink signals according to an embodiment of the present disclosure.
Figure 6:
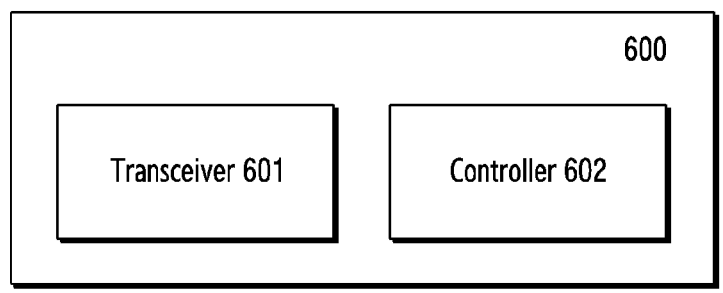
FIG. 6 illustrates a schematic diagram showing an electronic device that performs transmission of an uplink signals according to an embodiment of the present disclosure.

The contention-based random access in LTE-A is divided into four steps, as shown in FIG. 4. In the first step, the user randomly selects a preamble sequence from the preamble sequence resource pool and transmits the preamble sequence to the base station. The base station detects the correlation of the received signals, so as to identify the preamble sequence transmitted by the user. In the second step, the base station transmits a random access response (RAR) to the user, which includes a random access preamble sequence identifier, a timing advance instruction determined according to the time delay estimation between the user and the base station, a cell-radio network temporary identifier (C-RNTI), and time-frequency resources allocated for the next uplink transmission of the user. In the third step, the user transmits the message 3 (Msg3) to the base station according to the information in RAR. Msg3 contains information such as user terminal identification and RRC link request, wherein the user terminal identification is unique to the user and is used to resolve conflicts. In the fourth step, the base station transmits a conflict resolution identification to the user, which includes the user terminal identification that won in the conflict resolution. After the user detects his own identification, the UE upgrades the temporary C-RNTI to C-RNTI, transmits an ACK signal to the base station, completes the random access procedure, and waits for the scheduling of the base station. Otherwise, the user may start a new random access procedure after a delay.

For the Contention-free random access, because the base station knows the user identification, the preamble sequence can be assigned to the user. Therefore, when transmitting the preamble sequence, the user does not need to randomly select the sequence, but may use the assigned preamble sequence. After detecting the assigned preamble sequence, the base station may transmit a corresponding random access response, including timing advance information, uplink resource allocation and other information. After receiving the random access response, the user thinks that the uplink synchronization has been completed and waits for further scheduling by the base station. Therefore, the contention-free random access includes two steps: step one is to transmit the preamble sequence; and step two is to transmit the random access response.

Random access procedure in LTE is suitable for the following scenarios:
1. Initial access in RRC_idle;
2. Re-establish RRC connection;
3. Cell handover;
4. Downlink data arriving and requesting random access procedure in RRC connection state (when the uplink is asynchronous);
5. Uplink data arriving and requesting random access procedure in RRC connection state (when the uplink is asynchronous or no resource in PUCCH resources is allocated to scheduling request); and
6. Positioning.

In some network systems, such as 5G NR system, it is possible to support the re-transmission of message 3 in the case of beamforming and/or limited coverage. However, how to obtain the correct resource configuration and determine the available resources to transmit message 3 is a problem to be solved. In addition, in some systems that allow users to transmit some data without connecting, how to obtain the correct resource configuration and determine the available resources for uplink data transmission is also a problem to be solved.

In the transmission of supporting uplink data signals, for example, in the scene of small data transmission (SDT), the UE can be allowed to transmit data signals without fully accessing the system and becoming a connected state. In an embodiment of the present disclosure, the resource confirmation mode and transmission mode of the uplink data signals provided by the present disclosure enable the UE to acquire the mapping relationship between the uplink transmission resources and the downlink beams configured in advance through the method provided by the present disclosure, and when uplink data signal transmission is required, the uplink data signal transmission can be determined on the corresponding uplink transmission resources according to the selected downlink beams. The mode provided by the disclosure can be used not only for SDT scenes, but also for uplink data signal transmission of other scenes. The following is an exemplary description of the method by taking the uplink data signal transmission of SDT as an example. SDT is divided into SDT based on configured grant (CG-SDT) and SDT based on random access (RA-SDT).

In the case of SDT(CG-SDT) transmission based on configured grant, a UE may obtain configuration information of one or more CG-PUSCH for CG-SDT transmission from base station equipment, wherein the configuration information of CG-PUSCH includes one or more combinations of the following items:

The size of one PUSCH transmission resource (such as a number of occupied time units and/or a number of frequency domain units) and location of one PUSCH transmission resource (such as the starting time unit position in one time slot);

DMRS resource allocation of one PUSCH, including sequence index of DMRS and/or port index of DMRS;

The period size of one CG-PUSCH;

A number of transmission resources of PUSCH in one CG-PUSCH period (including the number in time domain and/or frequency domain); and A set of downlink signals associated with the resources of CG-PUSCH, that is, one or a group of downlink signals (such as SSB and/or CSI-RS, SSB is used as an example in the present disclosure, but it can be replaced by CSI-RS).

Particularly, when the UE does not obtain the indication of one or a group of SSBs (that is, the indication is missing), the UE may:

use the SSB index configured in the system broadcast message (such as ssb-PositionsInBurst) of the base station equipment as one or a group of associated SSBs; particularly, the system broadcast message of the base station equipment can be the system broadcast message read by the UE before entering RRC_INACTIVE, or the latest system broadcast message read by the UE (before SDT); and/or map the SSB index in the system broadcast message to the configured CG-PUSCH sequentially according to the sequential order, including:

Sequentially mapping the SSB index to one or more PUSCH resources in one CG-PUSCH. For example, if SSB0, 1, 2, 3 in total are used and one CG-PUSCH configuration includes four PUSCH transmission resources, SSB0 is mapped to PUSCH transmission resource 0, SSB1 is mapped to PUSCH transmission resource 1, SSB2 is mapped to PUSCH transmission resource 2, and SSB3 is mapped to PUSCH transmission resource 3. Specially, the index order of PUSCH resources could be frequency domain first, followed by time domain in one CG-PUSCH period; or time domain first, followed by frequency domain. The number of PUSCH transmission resources can be replaced by the number of resources of PUSCH DMRS and/or the number of PUSCH transmission units (including one PUSCH transmission resource and one DMRS); or Sequentially mapping the SSB index to a plurality of CG-PUSCH configurations. For example, if SSB0, 1, 2, 3 in total are used and there are four CG-PUSCH configurations in total, SSB0 is mapped to the first CG-PUSCH configuration, SSB1 is mapped to the second CG-PUSCH configuration, SSB2 is mapped to the third CG-PUSCH configuration, and SSB3 is mapped to the fourth CG-PUSCH configuration.

Preferably, in the associated SSB indication, four SSBs can be accurately configured with the PUSCH transmission resources, such as four PUSCH transmission resources (PUSCH 0, 1, 2, 3) contained in one CG-PUSCH configuration, to which the associated SSB is mapped. For example, PUSCH0 indicates SSB0, PUSCH1 indicates SSB1, PUSCH2 indicates SSB2, and PUSCH3 indicates SSB3, in which the indicated SSBs can be the same or different, so that one SSB mapped by PUSCH can be flexibly configured. Or the SSB can be sequentially mapped by the determined associated SSB index, which can save signaling overhead:

The mapping ratio indication of the associated SSB to the PUSCH in the corresponding CG-PUSCH, that is, the information about one or more SSBs can be mapped on one PUSCH resource is obtained:

when the UE obtains the mapping ratio indication, the mapping of SSB-PUSCH is made according to the indicated mapping ratio; and when the UE does not obtain the above mapping ratio indication, the UE may:

Not perform the mapping operation of SSB-PUSCH, that is, as long as the selected SSB during SDT is in the associated SSBs, the UE can use the corresponding CG-PUSCH resources for transmission. If there are multiple optional PUSCH transmission resources and/or DMRS resources, the UE could randomly select one with equal probability for transmission; and/or Determine the mapping ratio value by the ratio of the number of PUSCH transmission resources to the number of associated SSBs in one CG-PUSCH period (the obtained ratio can be rounded or the closest preset ratio not less than or greater than the obtained ratio can be found as the mapping ratio value). Particularly, the number of PUSCH transmission resources can be replaced by the number of resources of PUSCH DMRS and/or the number of PUSCH transmission units (including one PUSCH transmission resource and one DMRS), that is, different transmission resources or different DMRS are different PUSCH transmission units.

In the process of mapping SSB to PUSCH, for one or more SDT CG-PUSCH configurations (which can also be simply described as one or more PUSCH configurations, which have the same meaning as the previous CG-PUSCH configurations), starting from frame 0, a mapping period used to map SSB index to valid PUSCH occasions and/or DMRS resources associated with PUSCH occasions is the minimum of one or more candidate value sets of SSB-PUSCH mapping periods that meet certain conditions. In addition, one mapping pattern period of SSB-PUSCH includes one or more mapping periods, in which the mapping patterns of SSB index and PUSCH resources are repeated at most in $T_{max}$ time. Specifically, in which:

The certain conditions at least include: the $N_{TX}^{SSB}$ SSBs can be mapped once at least in the valid PUSCH occasions in the mapping period; wherein $N_{TX}^{SSB}$ SSBs can be one or a group(s) of SSBs (such as SSB-positions inbound) obtained from system information block 1(SIB1) or serving cell public configuration message (ServingCellConfigCommon); or obtained from one or a group(s) of SSBs in one or more corresponding SDT CG-PUSCH configurations. Particularly, as already described, when one or a group(s) of SSBs are not configured in one or more SDT CG-PUSCH configurations, one or a group(s) of SSBs (such as ssb-PositionsInBurst) in the slave system information block 1 (SIB1) or the slave cell public configuration message (ServingCellConfigCommon) are used;

The SSB-PUSCH mapping period can be N times the SDT CG PUSCH configuration period (that is, the period size of the previous CG-PUSCH), where N is an integer greater than or equal to 1; and/or The candidate value set of SSB-PUSCH mapping period includes: for one SDT CG PUSCH configuration period value $P_{cg-sdt}$ (which can be in absolute time such as milliseconds, seconds, etc.; or other time units such as OFDM symbols, time slots, etc.), its corresponding candidate value set of SSB-PUSCH mapping period is $\{1, \ldots [P_{cg-sdt-large}/P_{cg-sdt}], \ldots, T_{max}*N_{symbperslot}*2^{\mu}/P_{cg-sdt}\}$, specifically:

wherein $P_{cg-sdt}$ is obtained by UE from SDT CG PUSCH period configuration information (such as "periodicity" and/or "periodicityext"). For example, the optional set of configuration values included in SDT CG PUSCH periodic configuration information may be TABLE 1:

TABLE 1

| Periodic candidate vales set | |
|---|---|
| Sub-carrier interval (khz) | Periodic candidate values (symbols) set |
| 15 (normal CP) | 2, 7, n * 14, wherein n = {1, 2, 4, 5, 8, 10, 16, 20, 32, 40, 64, 80, 128, 160, 320, 640} or m * 14, where m is a positive integer value from 1 to 640. |

TABLE 1-continued

Periodic candidate vales set

| Sub-carrier interval (khz) | Periodic candidate values (symbols) set |
|---|---|
| 30 (normal CP) | 2, 7, n * 14, where n = {1, 2, 4, 5, 8, 10, 16, 20, 32, 40, 64, 80, 128, 160, 256, 320, 640, 1280} or m * 14, where m is a positive integer from 1 to 1280. |
| 60 (normal CP) | 2, 7, n * 14, where n = {1, 2, 4, 5, 8, 10, 16, 20, 32, 40, 64, 80, 128, 160, 256, 320, 512, 640, 1280, 2560} or M * 14, where m is a positive integer from 1 to 2560. |
| 60 (extended CP) | 2, 6, n * 12, where n = {1, 2, 4, 5, 8, 10, 16, 20, 32, 40, 64, 80, 128, 160, 256, 320, 512, 640, 1280, 2560} or m * 12, where m is a positive integer from 1 to 2560. |
| 120 (normal CP) | 2, 6, n * 12, where n = {1, 2, 4, 5, 8, 10, 16, 20, 32, 40, 64, 80, 128, 160, 256, 320, 512, 640, 1024, 1280, 2560, 5120} or m * 14, where m is a positive integer from 1 to 5120. | wherein $P_{cg\text{-}sat\text{-}large}$ is one or more period values greater than (or not less than) $P_{cg\text{-}sat}$ in the optional set of CG-PUSCH period configuration;

wherein $T_{max}$ is the maximum value of the configured or default SSB-PUSCH mapping period or the maximum value of the SSB-PUSCH mapping pattern period. For example, the default value is 160 ms or 640 ms;

wherein the $N_{symbperslot}$ is the number of symbols in one time slot. For example, in normal CP(cyclic prefix), $N_{symbperslot}=14$, and in extended CP, $N_{symbperslot}=12$;

wherein $2^\mu$ represents the subcarrier interval indication, and $\mu=0, 1, 2, 3, 5,$ and 6 respectively represent 15 kHz, 30 kHz, 60 kHz, 120 kHz, 480 kHz, and 960 kHz; and wherein [X] is a rounding operation for X, preferably, it can be rounded up or down.

Before SDT, UE can select an SSB through downlink measurement, and the selection method can include one (interchangeable) or a combination of the followings:

According to the DL-RSRP threshold configured by the base station, if the measured SSB-RSRP is greater than the DL-RSRP threshold, the UE selects the SSB; and if more than one SSB exceeds the threshold, then:
UE selects one SSB with the largest RSRP value as the selected SSB; or
UE randomly selects one SSB as the selected SSB with equal probability;
UE selects one SSB with the largest SSB-RSRP value as the selected SSB.

Preferably, when the SSB selected by the UE is not in the SSB s associated with the CG-PUSCH received by the UE, for example, when the base station indicates in the CG-PUSCH configuration that the associated SSBs are SSB0,1, but the selected SSB by the UE is SSB3, UE can perform one or more of the following operations:
The UE does not perform CG-SDT, but (switches to) performs SDT based on random access, that is, RA-SDT. Preferably, SDT with two-step random access is preferred;
The UE assumes that the SSB can only be selected from the associated SSBs indicated in the CG-PUSCH configuration by the base station, that is, the selection method is applied to the associated SSB set (i.e., one or more SSBs) indicated by the base station in the CG-PUSCH configuration determined by the UE. The specific operations could be found from the above methods, which may not be repeated here; and
The UE assumes that the associated SSB indicated by the base station in CG-PUSCH configuration may include all SSBs that the UE may measure; otherwise, the UE thinks that the UE is a wrong situation, and the operation is undefined.

After determining the SSB and the corresponding PUSCH resources, the UE can transmit the corresponding uplink data signals.

In another embodiment of the present disclosure, when using RA-SDT for data transmission, UE needs to obtain random access resource configuration information for RA-SDT, wherein the random access resource configuration information includes a combination of one or more of the followings:

The random access occasion (RO, that is, random access time-frequency resource) configuration information, including:
Random access configuration period;
The number and/or pattern of random access occasions in time domain in each configuration period;
The number and/or pattern of random access occasions in frequency domain in each configuration period;
Particularly, when the random access occasions for SDT are shared with other types of random access occasions, the available random access occasions are jointly confirmed by the PRACH mask index and corresponding SSB index and/or the types of random access, wherein the types of random access can be a combination of one or more of the followings:
Four-step random access;
Two-step random access;
SDT based on four-step random access; and/or
SDT based on two-step random access;
Random access preamble configuration information, including:
The number and/or starting point position index of preamble used for SDT transmission corresponding to one SSB in one random access occasion; and
Sequence initial index of random access preamble.

According to the above methods, the UE can obtain the random access resource configuration information for SDT, which is used to further determine the used random access resources for SDT.

In another embodiment of the present disclosure, in the process of data transmission in SDT, when certain conditions occur, the quality of the downlink transmission beam selected by UE, for short, the downlink beam (such as SSB index) may change, so it may be necessary to change a new downlink beam. This embodiment provides a method to enable UE to inform the beam change in SDT process.

Specifically, the certain conditions can be a combination of one or more of the followings:

The beam currently selected by the UE can still work (that is, it is higher than or not lower than the RSRP threshold set by the base station), but the UE detects that there is a better beam (for example, a higher SSB has a RSRP value). For example, the UE currently selects SSB1, although the RSRP value of SSB1 is also higher than the threshold value; but the UE detects that the RSRP value of SSB2 is higher; and it is possible that UE needs to switch to SSB2;

The beam currently selected by the UE cannot work (that is, the beam is lower than or not higher than the RSRP threshold set by the base station), but the UE detects the beam that can work (for example, the beam is higher or not lower than the RSRP threshold set by the base station). For example, the UE currently selects SSB1, and the RSRP value of SSB1 is also lower than the threshold value because of the environmental deterioration; however, the UE detects that the RSRP value of SSB2 is higher than the RSRP threshold set by the base station; and it is possible that UE needs to switch to SSB2;

The beam currently selected by the UE cannot work (that is, the beam is lower than or not higher than the RSRP threshold set by the base station), and the UE has not detected the beam that can work (for example, the measured values of all the alternative beams are lower or not higher than the RSRP threshold set by the base station); therefore, UE needs to switch to a working SSB; and/or Preferably, the comparison of the RSRP of the beam and the threshold value of the RSRP set by the base station can be the result of one comparison, or the result of N comparisons or N consecutive comparisons.

When the above conditions occur, the UE can notify the beam change in the SDT process by one or more of the following examples.

In one example, a UE reports the selected beam index (such as SSB index or CSI-RS index) through the PUCCH resource configured by the base station. When the beam index selected by the UE changes, the UE makes the report, and when the beam index selected by the UE does not change, the UE does not report.

Figure 7:
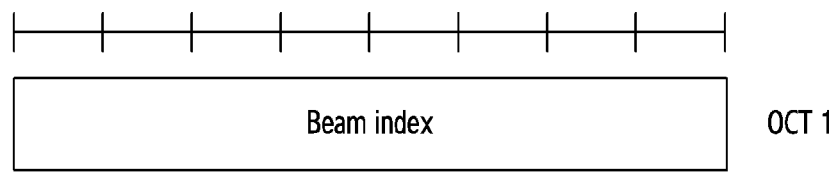
FIG. 7 illustrates a schematic diagram showing the MAC CE of beam index according to an embodiment of the present disclosure.

In one example, a UE reports the selected beam index (such as SSB index or CSI-RS index) through the MAC CE carried on PUSCH resource configured by the base station. As shown in FIG. 7, the SSB index can be 8 bits (for example, in FR2 band) or 3 bits (for example, in FR1 band, the reserved bits of the first 5 bits of MAC CE plus 3 bits of SSB index complement the structure of 8 bits). When the beam index selected by the UE changes, the UE makes the report; and when the beam index selected by the UE does not change, the UE does not report.

In one example, a UE reports the change of beam through UCI (UL control information) part carried on PUSCH, wherein the PUSCH can be a combination of one or more of the followings:

The PUSCH of message 3, such as the PUSCH of message 3 in RA-SDT;

CG-PUSCH, such as CG-PUSCH configured in CG-SDT; and

A dynamically scheduled PUSCH, such as the PUSCH dynamically scheduled after completing the random access procedure (e.g., after msg4) in RA-SDT, and/or the base station dynamically scheduling PUSCH in CG-SDT received by UE.

Wherein the UCI can be a combination of one or more of the followings:

Beam index, such as SSB index or CSI-RS index;

Beam change indication index, for example, 1 bit indicating whether the bit has been changed, for example, "0" indicates no change; "1" indicates a change;

HARQ-ACK/NACK information, for example, in SDT process, UE needs to transmit PUCCH feedback information (i.e., HARQ-ACK/NACK information) of downlink signals scheduled by base station, and when PUCCH and PUSCH overlap in time domain (or they are at the same time in a certain time period, such as the same time slot), the UCI in HARQ-ACK/NACK also needs to be multiplexed and carried on PUSCH; and Preferably, when there are more than one UCI carried in PUSCH, the followings can be adopted:

The separate coding methods for multiple UCI contents. The flexibility of each part can be maintained, but the complexity of the receiver may be increased; or Joint coding of multiple UCI contents, which can reduce the complexity of the receiver.

Wherein, the size (i.e., the number of bits) of the UCI can be confirmed in one or a combination of the following methods:

Fixed size. For example, in PUSCH, N bit positions of the UCI bits are reserved. The advantage of this is that the size of blinded UCI of the base station can be avoided;

Preferably, when the size of the UCI to be carried is smaller than the reserved UCI size, the front or back of the reserved UCI bits are mapped to the UCI to be carried, and other parts are supplemented with all 0s or all 1s, or with random or predefined bits;

Determined size of UCI according to the content of UCI to be reported;

For example, when the UCI includes the beam index, if the beam index is the SSB index in FR1 band, the beam index is 3 bits; and if a single beam index is SSB index in FR2 band, the beam index is 8 bits.

Determined size of the reserved UCI according to the direct configuration of the base station. For example, the base station configures the size of UCI that can be carried in PUSCH of SDT according to DCI or higher layer signaling (RRC release, or SIB1);

The UE can inform the base station of the newly selected beam index by the above methods, thus ensuring the reception of subsequent downlink signals.

In addition, in the SDT PUSCH transmission, UE also needs to determine the used uplink transmission beams, wherein the method can be one or a combination of the followings:

The transmission beam of one SDT PUSCH is determined by UE itself, that is, it can be changed or not;

The transmission beam of one SDT PUSCH is the uplink transmitting beam corresponding to the receiving beam, which corresponds to the currently selected downlink beam (SSB or CSI-RS). For example, if SSB 1 is currently selected, the used uplink transmitting beam is the downlink receiving beam used for receiving SSB1;

The transmission beam of one SDT PUSCH is the same as the transmission beam of one SRS index (SRI) indicated by the base station; and/or The PUSCH after msg4 of RA-SDT or PUSCH in CG-SDT is one or a combination of the followings:

The same transmission beam as the PUSCH transmission beam of the last msg3 (a same spatial filter as for the last msg3 PUSCH transmission);

The same transmission beam as that of the last PRACH (a same spatial filter as for the last PRACH transmission); or The same transmission beam as that of the last (latest) PUCCH (a same spatial filter as for the last PUCCH transmission).

In another embodiment of the present disclosure, in the process of repeated transmission of message 3 (msg3), there is provided a method for determining resource configuration and signal transmission in the present application. In this embodiment, the repeated transmission of message 3 is used as an example, and the introduced method can also be used for the transmission of other uplink signals, especially the repeated transmission of other uplink signals.

When the UE transmits the message 3, it is necessary to determine the transmission of the message 3 through the configuration message from the base station, wherein the transmission of the message 3 can be the repeated transmission (retransmission) of the message 3 or the initial transmission of the message 3. The retransmission is scheduled by DCI format 0-0 scrambled by TC-RNTI, and the initial transmission is scheduled by UL grant in random access response (RAR), wherein the configuration message comprises one or a combination of the followings:

the number of the retransmission of message 3, specifically:

By adding a column of repetition indications in the Time domain resource assignment (TDRA) table. For example, in a TDRA table with 16 rows, each row is added with an indication of repetition number, as shown in TABLE 2:

TABLE 2

| Time domain resource assignment | | | | | |
|---|---|---|---|---|---|
| Row index | PUSCH mapping type | K2 | S | L | Number of repetitions R |
| 1 | Type A | j | 0 | 14 | 1 |
| 2 | Type A | j | 0 | 12 | 1 |
| 3 | Type A | j | 0 | 10 | 1 |
| 4 | Type B | j | 2 | 10 | 1 |
| 5 | Type B | j | 4 | 10 | 2 |
| 6 | Type B | j | 4 | 8 | 2 |
| 7 | Type B | j | 4 | 6 | 2 |
| 8 | Type A | j + 1 | 0 | 14 | 2 |
| 9 | Type A | j + 1 | 0 | 12 | 4 |
| 10 | Type A | j + 1 | 0 | 10 | 4 |
| 11 | Type A | j + 2 | 0 | 14 | 4 |
| 12 | Type A | j + 2 | 0 | 12 | 4 |
| 13 | Type A | j + 2 | 0 | 10 | 8 |
| 14 | Type B | j | 8 | 6 | 8 |
| 15 | Type A | j + 3 | 0 | 14 | 8 |
| 16 | Type A | j + 3 | 0 | 10 | 8 |

By reporting through the existing bits or idle bits in the uplink grant, which specifically includes at least one of the following examples. In one example, indicating by the bit field of modulation and coding scheme, MCS, is included. For example, there is a 4-bit MCS bit field, which originally indicates one of 16 MCS, and N bits in the MCS bit field are now used as an indication of the number of repetitions. The N bits indicate 2N kinds of repetition numbers, for example, if N=2, then 4 kinds of repetition can be indicated, for example {1, 2, 4, 8}. Preferably, the N bits are high-order N bits, because in the case of retransmission of message 3, it is more likely to use MCS with lower bit rate and lower modulation order, therefore the upper bits are used to indicate the number of repetitions, and the remaining lower bits can continue to indicate MCSs in the MCS configuration table (in this situation, there are $2^{(4-N)}$ optional MCSs, and the first $2^{(4-N)}$ indexes in the table can be selected for MCS). Or the high-order bits are filled with 0 to normally indicate MCSs in MCS table.

For example, the MCS bit field is 4 bits, 0110, and the number of repetitions is indicated by 2 MSBs (most significant bit) in 4 bits, i.e., 01, which corresponds to 2 in Table 2. The remaining lower 2 bits of MCS are 10. The high-order bits are then filled with 0, which results as 0010, corresponding to the MCS configuration with index of 2 in the first 16 rows of MCS. Preferably, the remaining least significant bits can continue to indicate that the MCSs in the MCS configuration table comes from the MCS index set configured by the base station. For example, if the remaining least significant bits are 2 bits, the base station configures 4 possible MCS indexes with 2 bits in the system message (for example, SIB1). If the remaining least significant bits are 3 bits, the base station configures 8 possible MCS indexes with 3 bits in the system message (such as SIB1).

Preferably, the UE obtains 8 possible MCS index values configured by the base station with 3 bits in the system message (for example, SIB1), and when the remaining least significant bits are 2 bits (for example, in UL grant of the RAR scheduling, the remaining least significant bits of MCS are 2 bits), the UE uses the first 4 of the 8 possible MCS index values configured with 3 bits. When the remaining least significant bits are 3 bits (for example, in UL grant scheduled with DCI format 0_0 scrambled by TC-RNTI, the remaining least significant bits of MCS are 3 bits), the UE uses 8 possible MCS index values configured by the 3 bits. For example, if the 8 possible MCS index values of the 3-bit configuration are {0, 1, 3, 4, 6, 7, 9, 10}, when the remaining least significant bits are 2 bits, the UE uses the first 4 MCS index values of the above 8 configurations to make one-to-one correspondence with the 4 bit values of the remaining 2 least significant bits (for example, 00 corresponds to MCS 0, 01 corresponds to MCS 1, 10 corresponds to MCS 3, and 11 corresponds to MCS 4).

When the remaining least significant bits are 3 bits, the UE uses all 8 configured MCS index values to make one-to-one correspondence with the 8 bit values of the remaining 3 least significant bits (for example, 000 corresponds to MCS 0, 001 corresponds to MCS 1, 010 corresponds to MCS 3, 011 corresponds to MCS 4, 100 corresponds to MCS 6, 101 corresponds to MCS 7, 110 corresponds to MCS 9, and 111 corresponds to MCS 10). Preferably, when 8 possible MCS index values of the above 3 bit configurations are not provided, the first 8 indexes in the MCS table, i.e., MCS0~7, are used by default.

TABLE 3

Repetition number indication

| Repetition number indication bits value | Repetition number |
|---|---|
| 00 | 1 |
| 01 | 2 |
| 10 | 4 |
| 11 | 8 |

Indicating two repetition numbers by CSI request bit (1 bit);

The combination of the above two modes, wherein the N bits are combined with other bits for the indication. For example, when N=1 bit and the CSI request bit (1 bit) are combined, 2 bits in total are used to indicate four repetition numbers, for example {1, 2, 4, 8};

The combination of N bits to support the indication of TDRA configuration more than 16 rows. For example, if the original TDRA indication is 4 bits, and N=2 bit, then the combination of 6 bits can indicate the TDRA configuration of 64 rows (including the indication of repetition number), so it can better provide flexible configuration when supporting the indication of repetition number.

In one example, indicating by other remaining reserved bits in DCI is included, and the specific indication mode is similar to the existing bit mode in UL grant mentioned above, which will not be repeated here. The available reserved bits include at least one of the following (which can be mutually substituted):

For msg3 retransmission, all or part of HARQ process number indicator bits, HARQ process number—4 bits, can be used;

For msg3 retransmission, a new data indicator bit, new data indicator—1 bit, can be used; and For the initial transmission of msg3, reserved bits—(16-A) in PDCCH for scheduling RAR (scrambled by RA-RNTI).

In one example, indicating by the combination of the reserved bits in the above DCI and the existing/reserved bits in UL grant are included, and the specific indication mode is as described above and will not be repeated here.

the indication of the table to which the TDRA indication bit applies. When there are TDRA tables for traditional users (i.e., the first table without the indication of repetition number) and TDRA tables for supporting the transmission of message 3 (i.e., the second table with the indication of repetition number) in the system, the UE requests the retransmission of message 3 through the corresponding random access resources. However, the base station may not be able to configure the UE with resources for retransmission due to limited resources, and it can only configure TDRA with a repetition number of 1 (which is also equivalent to no retransmission). In this situation, if only the TDRA configuration with a limited repetition number of 1 in the second table can be used, the selection is very limited, so it is necessary to indicate the TDRA configuration in the first table. Then the UE needs to know whether the indicated TDRA configuration is applicable from the first table or the second table.

The specific received indication may be:

For the initial transmission of msg3, indicating by 1 bit in MAC subheader, or by 1 bit in RAR;

For msg3 retransmission, indicating by 1 bit reserved bit in DCI;

Preferably, the above-mentioned 1-bit (reserved) indication can be used to indicate whether the UE obtains the message 3 retransmission resource of the base station, and when the message 3 retransmission resource, such as "0," is not obtained, the UE selects the first table to determine the TDRA. When the message 3 retransmission resource, such as "1," is obtained, the UE selects the second table to determine TDRA. Specifically, each row in the second table has a repetition number greater than 1, that is, there is no row with a repetition number of 1; and/or Preferably, the above-mentioned 1-bit (reserved) indication can be used to indicate whether the UE determines the retransmission number and/or time domain resources of message 3 based on one-row of the TDRA of the first table combined with repetition value indicated in the MCS bits, or one-row of the TDRA of the second table (including the repetition number value). For example, if one bit is "0," the UE determines the retransmission number and/or time domain resources of message 3 according to one-row of the first table indicated by TDRA combined with repetition value configuration indicated in the MCS bits; and if this bit is "1," the UE determines the retransmission number and/or time domain resources of message 3 by using one-row of the second table (including the repetition number value) indicated by TDRA.

After the UE determines the configuration of TDRA and the configuration of repetition number, the UE needs to judge whether the configured time domain resources are available (or effective). The specific judgment mode can be one or a combination of the followings, wherein the following judgment examples take the operation in one time slot as an example and can be extended to the operation of other time units.

In one example, when the configured time unit conflicts with the time unit of a specific signal, it is considered that the time unit with conflict is unavailable or the whole transmission resource containing the time unit with conflict is unavailable, and the specific signal includes at least one of the followings:

Downlink (DL) signal in TDD-UL-DL configuration;
Flexible signal in TDD-UL-DL configuration;
SSB signal configured in RRC message;
Search space signal of Type0-PDCCH; and/or
Invalid symbol pattern configured by the base station. The advantage of defining invalid symbol pattern is that for msg3, in order to make more dynamic use of time-frequency resources (whether it is to protect other signals and reduce the available resources of msg3 or to make full use of spare resources to transmit msg3), the base station can configure invalid symbol pattern when scheduling retransmission of msg3.

Wherein, the received invalid symbol pattern is configured by a combination of one or more of the followings:

A list with one or more invalid symbol patterns is configured in the system information, and each row indicates the available or unavailable time-domain units within a certain length of time. For example, if the length of time can be one time slot (i.e., 14 OFDM symbols), the 14 symbols in one time slot, i.e., 00000001111111, are indicated to the UE by means of bit map, and the last 7 symbols are available (when "0" means unavailable, "1" means available);

TABLE 4

Invalid symbol pattern configuration

| Configuration bit values | Invalid symbol pattern |
|---|---|
| 00 | 00001111111100 |
| 01 | 00001111111111 |
| 10 | 00000001111111 |
| 11 | 00000001111100 |

The configuration of invalid symbol patterns are indicated in DCI for scheduling the retransmission of msg3 (i.e., the DCI scrambled by RA-RNTI for the scheduling RAR for the initial transmission of msg3, and the DCI scrambled by TC-RNTI for the retransmission of msg3), and preferably, it can indicate a row in the configuration list of invalid symbol patterns configured in the above system message; and/or The configuration of invalid symbol patterns is indicated in UL grant or RAR (initial transmission) for scheduling the retransmission of msg3, and preferably, in this situation, only 1 bit is used to determine whether the invalid symbol pattern indicated in the above DCI is active, for example, 1 means active use and 0 means inactive.

The Determined active invalid symbol pattern is applied in all the time slots of the configured message 3 repetition.

When the configured time unit conflicts with the time unit and frequency domain unit of a specific signal, it is considered that the time unit with conflict is unavailable or the whole transmission resources including the time unit with conflict are unavailable, and the specific signal includes at least one of the followings:

Valid random access occasion, valid RO; and/or
Valid PUSCH occasion (for two-step random access), valid PO.

After the UE determines whether the resources on a time slot are valid, it is necessary to process the invalid time slot (or the invalid resources on the time slot), and the specific methods include at least one of the followings:

The time slot (that is, the time slot considered unavailable) or the invalid resources on the time slot are not used, that is, the time slot or the resources on the time slot are dropped; and/or The resources of the time slot are postponed, and the postponed size is a fixed time unit, that is, the whole time slot is postponed after one time slot, i.e., the next time slot and so on.

After the UE determines the available resources, the UE can transmit the uplink data of message 3.

This embodiment also provides a user equipment 500 for transmitting uplink signals. The user equipment 500 includes a transceiver 501 and a controller 502, wherein the transceiver 501 is used for receiving signals from a base station and transmitting uplink signals to the base station. The controller 502 is configured to receive signals from the transceiver 501 and transmit signals to the transceiver 501. In addition, the controller 502 is further configured to receive the first configuration information for the transmission of uplink data signals from the base station; and when the first configuration information of CG-PUSCH does not include the first information indicating the downlink signal to which the resources of CG-PUSCH are associated, to take the second information configured in the system broadcast message of the base station as the information indicating the downlink signal to which the resources of CG-PUSCH are associated.

This embodiment also provides an electronic device 600 for signal transmission. The user equipment includes a memory 601 and a processor 602, wherein computer-executable instructions are stored in the memory, and when the instructions are executed by the processor 602, at least one of the methods corresponding to the above embodiments of the disclosure is executed.

According to various embodiments, a method performed by a user equipment in a wireless communication system, comprising: receiving first configuration information for transmitting uplink data signals from a base station, determining uplink transmission resources based on a first downlink signal associated with uplink transmission resources indicated in the first configuration information, and transmitting the uplink data signals.

In some embodiments, the method further comprising: when the first configuration information does not include an indication of the first downlink signal to which uplink transmission resources are associated, determining uplink transmission resources according to a second downlink signal configured in a system broadcast message of the base station, and transmitting uplink data signals.

In some embodiments, wherein the system broadcast message is a system broadcast message read by the user equipment before entering the radio resource control RRC inactivity or a latest system broadcast message.

In some embodiments, wherein the first downlink signal or the second downlink signal includes any one of a synchronization signal block SSB and a channel state information reference signal CSI-RS.

In some embodiments, wherein the user equipment determines uplink transmission resources by at least one of the following ways: determining uplink transmission resources according to the uplink transmission resources to which the first downlink signal is mapped; determining uplink transmission resources according to the mapping of the first downlink signal or the second downlink signal to uplink transmission resources in sequence.

In some embodiments, the method further comprising: when the first configuration information for transmitting uplink data signals does not include an indication of the mapping ratio of the first downlink signal to a corresponding uplink transmission resource, the user equipment transmits by at least one of the following ways: when the selected downlink signal is in the first downlink signal or the second downlink signal while transmitting the uplink data signals, the user equipment transmits using the uplink transmission resource corresponding to the selected downlink signal; if there are multiple optional uplink transmission resources and/or demodulation reference signal DMRS resources, the user equipment randomly selects one resource to transmit.

In some embodiments, the method further comprising: when the first configuration information for transmitting uplink data signals does not include an indication of the mapping ratio of the first downlink signal to uplink transmission resources, the user equipment determines the mapping ratio according to the ratio of at least one of the following numbers to a number of associated downlink signals: a number of physical uplink shared channel PUSCH transmission resources in the configuration period of the uplink data signals; a number of resources of physical uplink shared channel demodulation reference signal PUSCH DMRS; and a number of physical uplink shared channel PUSCH transmission units.

In some embodiments, the method further comprising: before uplink data signal transmission, the user equipment selects downlink signals through downlink measurement, and when the downlink signals selected by the user equipment are not among the downlink signals associated with the uplink data signals received by the user equipment, the user equipment performs at least one of the following operations: the user equipment transmits uplink data signals based on random access; the user assumes that the downlink signal can only be selected from the associated downlink signals indicated by the base station in the uplink data signal configuration; or the user equipment assumes that the associated downlink signals indicated by the base station in the uplink data signal configuration include all downlink signals that the user equipment may measure.

In some embodiments, wherein determining uplink transmission resources for transmitting uplink signals includes: determining a number of retransmission of uplink data signals, wherein, the number of retransmission of uplink data signals is determined according to time domain resource assignment TDRA table, existing bits or idle bits in uplink UL grants, other remaining reserved bits in downlink control information DCI and/or a combination of reserved bits in downlink control information DCI and existing/reserved bits in uplink UL grants.

In some embodiments, wherein determining uplink transmission resources for transmitting uplink signals includes: receiving indication information indicating a table to which time domain resource assignment TDRA indication bits are applicable, wherein for the initial transmission of uplink data signals, the indication information is received through a medium access control MAC or a random access response RAR; and wherein, for the retransmission of the uplink data signal, the indication information is received through the downlink control information DCI.

In some embodiments, the method further comprises: after the user equipment determines the configuration of time domain resource assignment TDRA and the configuration of repetition number, the user equipment judges whether the configured resources can be used for uplink data transmission, wherein when the configured time unit conflicts with the time unit of a specific signal, the time unit with the conflict is unavailable or the whole transmission resources including the time unit with the conflict are unavailable.

In some embodiments, wherein the specific signal includes invalid symbol pattern information configured by at least one of the followings: a list with invalid symbol patterns configured in system information; the downlink control information DCI for scheduling retransmission of uplink data signals; and the random access response RAR or uplink UL grant for scheduling retransmission of uplink data signals.

In some embodiments, the method further comprising: applying the determined activated invalid symbol pattern to all repeated time slots of the configured uplink data signals.

According to various embodiments, an electronic device, comprising: a memory configured to store a computer program; and a processor configured to run the computer program to implement the above methods.

The disclosure also provides a computer-readable medium on which computer-executable instructions are stored, and when the instructions are executed, any of the methods described in the embodiments of the disclosure is executed.

As used herein, "user equipment" or "UE" can refer to any terminal with wireless communication capability, including but not limited to mobile phones, cellular phones, smart phones or personal digital assistants (PDA), portable computers, image capturing devices such as digital cameras, game devices, music storage and playback devices, and any portable unit or terminal with wireless communication capability, or Internet facilities that allow wireless Internet access and browsing, etc.

As used herein, the term "base station" (BS) or "network equipment" can refer to eNB, eNodeB, NodeB or base transceiver station (BTS), or gNB, etc. according to the used technology and terminology.

The "memory" here can be of any type suitable for the technical environment herein, and can be implemented using any suitable data storage technology, including but not limited to semiconductor-based memory devices, magnetic memory devices and systems, optical memory devices and systems, fixed memory and mobile storage.

The processor here can be any type suitable for the technical environment of this application, including but not limited to one or more of the followings: general-purpose computer, special-purpose computer, microprocessor, digital signal processor DSP and processor based on multi-core processor architecture.

The above description is only the preferred embodiment of the present disclosure, and it is not intended to limit the present disclosure. Any modification, equivalent replacement, improvement, etc. made within the spirit and principle of the present disclosure should be included in the scope of the present disclosure.

It can be understood by those skilled in the art that the present disclosure includes devices for performing one or more of the operations described in this application. These devices can be specially designed and manufactured for the required purposes, or they can also include known devices in general-purpose computers. These devices have stored therein computer programs that are selectively activated or reconfigured. Such a computer program can be stored in a device (e.g., computer) readable medium or in any type of medium suitable for storing electronic instructions and respectively coupled to a bus, including but not limited to any type of disk (including floppy disk, hard disk, optical disk, CD-ROM, and magneto-optical disk), read-only memory (ROM), random access memory (RAM), erasable programmable read-only memory (EPROM), electrically erasable programmable read-only memory (EEPROM), flash memory, magnetic card or optical card. That is, a readable medium includes any medium that stores or transmits information in a readable form by a device (e.g., a computer).

It can be understood by those skilled in the art that each block in these structural diagrams and/or block diagrams and/or flow diagrams and combinations of blocks in these structural diagrams and/or block diagrams and/or flow diagrams can be implemented by computer program instructions. Those skilled in the art can understand that these computer program instructions can be provided to a processor of a general-purpose computer, a professional computer or other programmable data processing methods for implementation, so that the scheme specified in the block or blocks of the structure diagram and/or block diagram and/or flow diagram disclosed by the present disclosure can be executed by the processor of the computer or other programmable data processing methods.

Those skilled in the art can understand that the steps, measures and schemes in various operations, methods and processes already discussed in the present disclosure can be alternated, changed, combined or deleted. Furthermore, other steps, measures and schemes in various operations, methods and processes already discussed in the present disclosure can also be alternated, changed, rearranged, decomposed, combined or deleted. Furthermore, the steps, measures and schemes in various operations, methods and processes disclosed in the prior art can also be alternated, changed, rearranged, decomposed, combined or deleted.

The above is only a partial embodiment of the present disclosure. It should be pointed out that for those skilled in the art, without departing from the principle of the present disclosure, several improvements and embellishments can be made, which should also be regarded as the protection scope of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a wireless communication system, the method comprising:
   receiving, from a base station, a radio resource control (RRC) release message including information on one or more configured grant (CG) configurations, wherein the information includes first information on a periodicity for one or more CG physical uplink shared channels (PUSCHs) and second information on a CG small data transmission (SDT), and wherein the second information includes information on at least one synchronization signal/physical broadcast channel (SS/PBCH) block;
   identifying an association period for mapping at least one SS/PBCH block index of the at least one SS/PBCH block to at least one valid occasion for the one or more CG PUSCHs, wherein the association period is a smallest value in a set of association periods corresponding to the periodicity such that the at least one SS/PBCH block index is mapped at least once to the at least one valid occasion within the association period; and
   transmitting, to the base station, data associated with the CG SDT on a CG PUSCH among the one or more CG PUSCHs within the association period.

2. The method of claim 1, wherein the first information further includes information on a start symbol and a length of the one or more CG PUSCHs and information on resource allocation of the one or more CG PUSCHs, and
   wherein the second information further includes information on a sequence of a demodulation reference signal (DMRS) and a port of the DMRS, and information on the at least one SS/PBCH block per a CG PUSCH.

3. The method of claim 1, wherein, in case that the second information includes the information on the at least one SS/PBCH block, a number of the at least one valid occasion for the one or more CG PUSCHs is mapped to a number of the at least one SS/PBCH block index,
   wherein, in case that the second information does not include the information on the at least one SS/PBCH block, the number of the at least one valid occasion is mapped to a value indicating a position of the at least one SS/PBCH block included in a system information block 1 (SIB1),
   wherein an association pattern period includes the association period, and a pattern between the at least one valid occasion with the at least one SS/PBCH block index repeats at most 640 milliseconds, and
   wherein the association period is an integer multiple of the periodicity for the one or more CG PUSCHs.

4. The method of claim 1, further comprising:
   receiving, from the base station, the at least one SS/PBCH block; and
   identifying a first SS/PBCH block with a first reference signal received power (RSRP) above a threshold among the at least one SS/PBCH block for an initial transmission of data associated with the CG SDT on a first CG PUSCH,
   wherein, in case that the first RSRP of the first SS/PBCH block is not above the threshold after transmitting the data on the first CG PUSCH, a second SS/PBCH block with a second RSRP above the threshold among the at least one SS/PBCH block is identified.

5. A user equipment (UE) in a wireless communication system, the UE comprising:
   a transceiver; and
   a controller coupled with the transceiver and configured to:
   receive, from a base station, a radio resource control (RRC) release message including information on one or more configured grant (CG) configurations, wherein the information includes first information on a periodicity for one or more CG physical uplink shared channels (PUSCHs) and second information on a CG small data transmission (SDT), and wherein the second information includes information on at least one synchronization signal/physical broadcast channel (SS/PBCH) block,
   identify an association period for mapping at least one SS/PBCH block index of the at least one SS/PBCH block to at least one valid occasion for the one or more CG PUSCHs, wherein the association period is a smallest value in a set of association periods corresponding to the periodicity such that the at least one SS/PBCH block index is mapped at least once to the at least one valid occasion within the association period, and
   transmit, to the base station, data associated with the CG SDT on a CG PUSCH among the one or more CG PUSCHs within the association period.

6. The UE of claim 5, wherein the first information further includes information on a start symbol and a length of the one or more CG PUSCHs and information on resource allocation of the one or more CG PUSCHs, and
   wherein the second information further includes information on a sequence of a demodulation reference signal (DMRS) and a port of the DMRS, and information on the at least one SS/PBCH block per a CG PUSCH.

7. The UE of claim 5, wherein, in case that the second information includes the information on the at least one SS/PBCH block, a number of the at least one valid occasion for the one or more CG PUSCHs is mapped to a number of the at least one SS/PBCH block index,
   wherein, in case that the second information does not include the information on the at least one SS/PBCH block, the number of the at least one valid occasion is mapped to a value indicating a position of the at least one SS/PBCH block included in a system information block 1 (SIB1),
   wherein an association pattern period includes the association period, and a pattern between the at least one valid occasion with the at least one SS/PBCH block index repeats at most 640 milliseconds, and
   wherein the association period is an integer multiple of the periodicity for the one or more CG PUSCHs.

8. The UE of claim 5, wherein the controller is further configured to:
- receive, from the base station, the at least one SS/PBCH block, and
- identify a first SS/PBCH block with a first reference signal received power (RSRP) above a threshold among the at least one SS/PBCH block for an initial transmission of data associated with the CG SDT on a first CG PUSCH, and
- wherein, in case that the first RSRP of the first SS/PBCH block is not above the threshold after transmitting the data on the first CG PUSCH, a second SS/PBCH block with a second RSRP above the threshold among the at least one SS/PBCH block is identified.

9. A method performed by a base station in a wireless communication system, the method comprising:
- transmitting, to a user equipment (UE) a radio resource control (RRC) release message including information on one or more configured grant (CG) configurations, wherein the information includes first information on a periodicity for one or more CG physical uplink shared channels (PUSCHs) and second information on a CG small data transmission (SDT), and wherein the second information includes information on at least one synchronization signal/physical broadcast channel (SS/PBCH) block; and
- receiving, from the UE, data associated with the CG SDT on a CG PUSCH among the one or more CG PUSCHs within an association period,
- wherein the association period for mapping at least one SS/PBCH block index of the at least one SS/PBCH block to at least one valid occasion for the one or more CG PUSCHs is a smallest value in a set of association periods corresponding to the periodicity such that the at least one SS/PBCH block index is mapped at least once to the at least one valid occasion within the association period.

10. The method of claim 9, wherein the first information further includes information on a start symbol and a length of the one or more CG PUSCHs and information on resource allocation of the one or more CG PUSCHs, and
- wherein the second information further includes information on a sequence of a demodulation reference signal (DMRS) and a port of the DMRS, and information on the at least one SS/PBCH block per a CG PUSCH.

11. The method of claim 9, wherein, in case that the second information includes the information on the at least one SS/PBCH block, a number of the at least one valid occasion for the one or more CG PUSCHs is mapped to a number of the at least one SS/PBCH block index,
- wherein, in case that the second information does not include the information on the at least one SS/PBCH block, the number of the at least one valid occasion is mapped to a value indicating a position of the at least one SS/PBCH block included in a system information block 1 (SIB1),
- wherein an association pattern period includes the association period, and a pattern between the at least one valid occasion with the at least one SS/PBCH block index repeats at most 640 milliseconds, and
- wherein the association period is an integer multiple of the periodicity for the one or more CG PUSCHs.

12. The method of claim 9, further comprising:
- transmitting, to the UE, the at least one SS/PBCH block, wherein an initial transmission of data associated with the CG SDT on a first CG PUSCH is based on a first SS/PBCH block with a first reference signal received power (RSRP) above a threshold among the at least one SS/PBCH block, and
- wherein, in case that the first RSRP of the first SS/PBCH block is not above the threshold after transmitting the data on the first CG PUSCH, a transmission of data on a CG PUSCH for the CG SDT is based on a second SS/PBCH block with a second RSRP above the threshold among the at least one SS/PBCH block.

13. A base station in a wireless communication system, the base station comprising:
- a transceiver; and
- a controller coupled with the transceiver and configured to:
  - transmit, to a user equipment (UE) a radio resource control (RRC) release message including information on one or more configured grant (CG) configurations, wherein the information includes first information on a periodicity for one or more CG physical uplink shared channels (PUSCHs) and second information on a CG small data transmission (SDT), and wherein the second information includes information on at least one synchronization signal/physical broadcast channel (SS/PBCH) block, and
  - receive, from the UE, data associated with the CG SDT on a CG PUSCH among the one or more CG PUSCHs within an association period,
- wherein the association period for mapping at least one SS/PBCH block index of the at least one SS/PBCH block to at least one valid occasion for the one or more CG PUSCHs is a smallest value in a set of association periods corresponding to the periodicity such that the at least one SS/PBCH block index is mapped at least once to the at least one valid occasion within the association period.

14. The base station of claim 13, wherein the first information further includes information on a start symbol and a length of the one or more CG PUSCHs and information on resource allocation of the one or more CG PUSCHs,
- wherein the second information further includes information on a sequence of a demodulation reference signal (DMRS) and a port of the DMRS, and information on the at least one SS/PBCH block per a CG PUSCH,
- wherein, in case that the second information includes the information on the at least one SS/PBCH block, a number of the at least one valid occasion for the one or more CG PUSCHs is mapped to a number of the at least one SS/PBCH block index,
- wherein, in case that the second information does not include the information on the at least one SS/PBCH block, the number of the at least one valid occasion is mapped to a value indicating a position of the at least one SS/PBCH block included in a system information block 1 (SIB1),
- wherein an association pattern period includes the association period, and a pattern between the at least one valid occasion with the at least one SS/PBCH block index repeats at most 640 milliseconds, and
- wherein the association period is an integer multiple of the periodicity for the one or more CG PUSCHs.

15. The base station of claim 13, wherein the controller is further configured to:
- transmit, to the UE, the at least one SS/PBCH block, wherein an initial transmission of data associated with the CG SDT on a first CG PUSCH is based on a first SS/PBCH block with a first reference signal received power (RSRP) above a threshold among the at least one SS/PBCH block, and wherein, in case that the first RSRP of the first SS/PBCH block is not above the threshold after transmitting the data on the first CG PUSCH, a transmission of data on a CG PUSCH for the CG SDT is based on a second SS/PBCH block with a second RSRP above the threshold among the at least one SS/PBCH block.

* * * * *